J. A. WOTTON.
SYSTEM OF CHARGING SECONDARY BATTERIES.
APPLICATION FILED MAY 6, 1909.
1,059,096.
Patented Apr. 15, 1913.
2 SHEETS—SHEET 1.
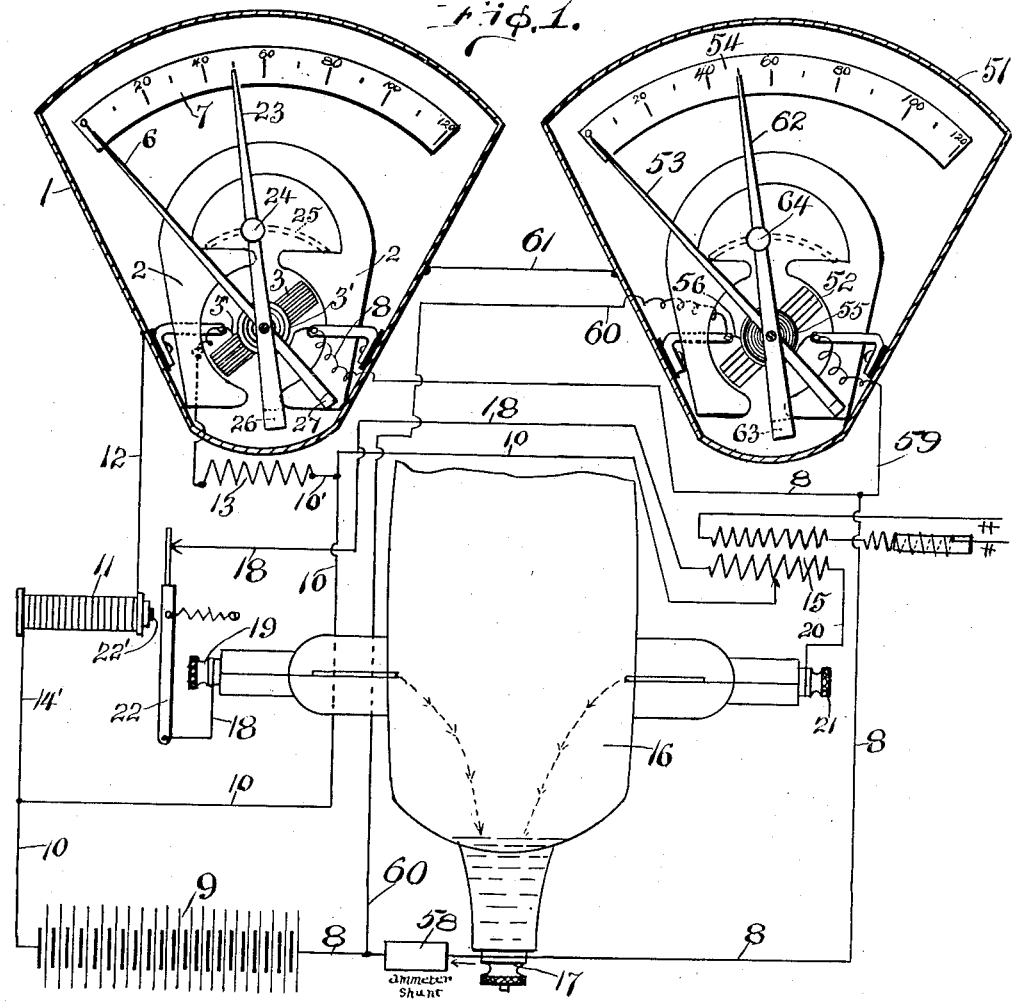
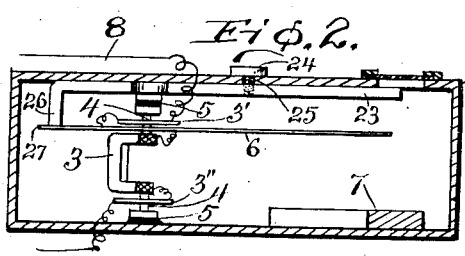
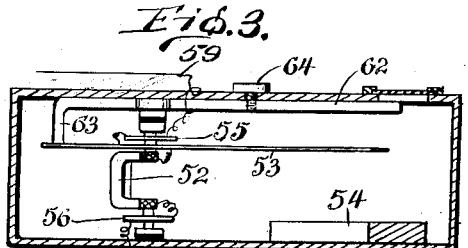
WITNESSES:
C. H. Fesler
O. A. Kitchin
INVENTOR
James A. Wotton,
BY Edgar M. Kitchin,
his Attorney.

J. A. WOTTON.
SYSTEM OF CHARGING SECONDARY BATTERIES.
APPLICATION FILED MAY 6, 1909.
1,059,096.
Patented Apr. 15, 1913.
2 SHEETS—SHEET 2.
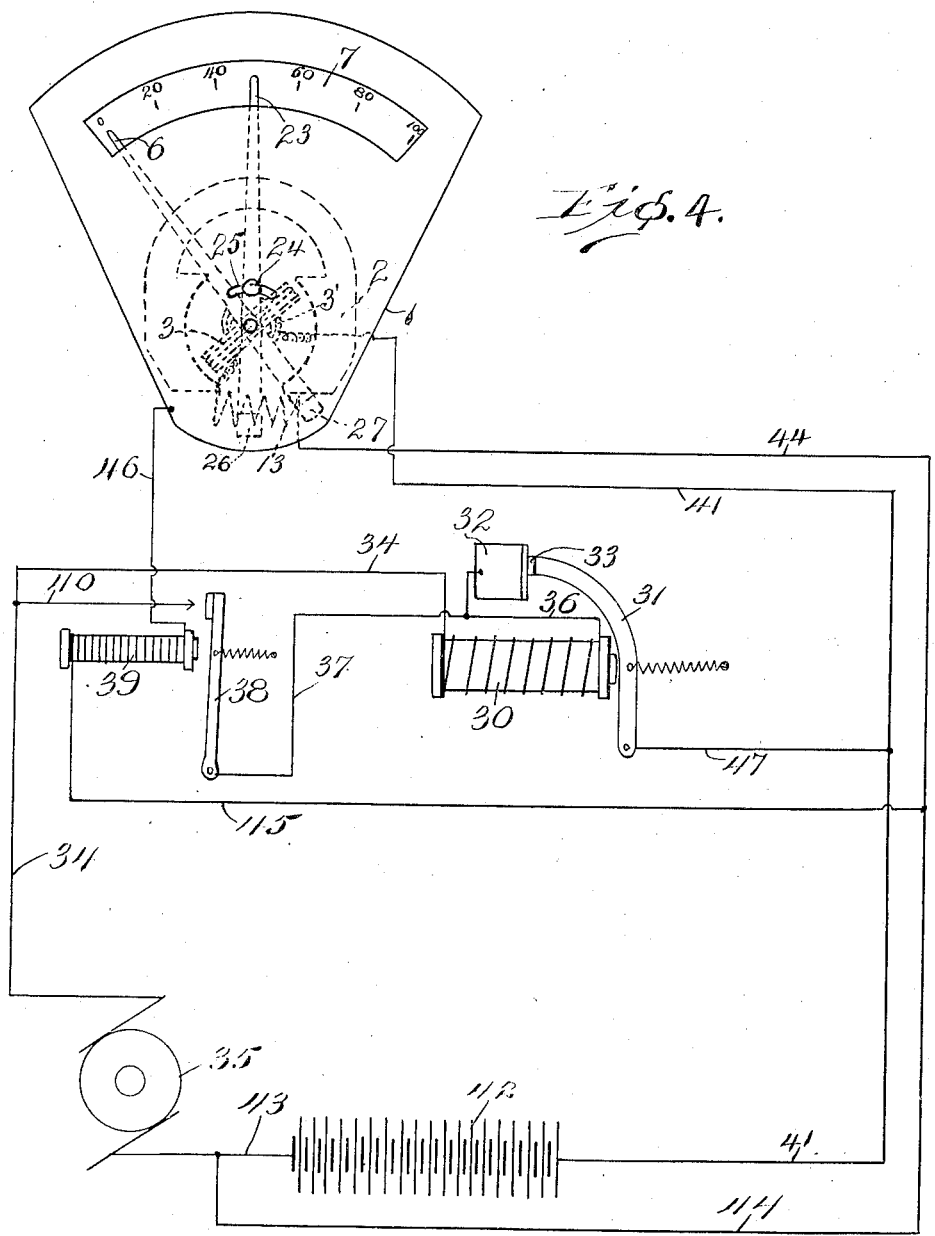
WITNESSES:
C. H. Fesler
O. A. Kitchin
INVENTOR
James A. Wotton,
BY Edgar M. Kitchin,
his Attorney.

UNITED STATES PATENT OFFICE.

JAMES A. WOTTON, OF ATLANTA, GEORGIA, ASSIGNOR TO ELECTRIC PRODUCTS CO., OF CLEVELAND, OHIO, A CORPORATION OF GEORGIA.

SYSTEM OF CHARGING SECONDARY BATTERIES.

1,059,096.   Specification of Letters Patent.   Patented Apr. 15, 1913.

Application filed May 6, 1909. Serial No. 494,265.

*To all whom it may concern:*

Be it known that I, JAMES A. WOTTON, a citizen of the United States, residing at Atlanta, in the county of Fulton and State of Georgia, have invented certain new and useful Improvements in Systems of Charging Secondary Batteries; and I do hereby declare the following to be a full, clear, and exact description of the invention, such as will enable others skilled in the art to which it appertains to make and use the same.

This invention relates particularly to a system for charging secondary batteries adapted for automatically stopping the supply of charging current at any predetermined point, and among the objects in view are the control of the circuit relative to the rise of voltage and the prevention of sparking at the circuit breaker, and also the guarding against overloads.

With these and further objects in view as will be hereinafter stated in part and in part will become obvious, the invention comprises certain novel constructions, combinations and arrangements of parts as will be hereinafter specified.

In the accompanying drawings,—Figure 1 is a diagrammatic view of a system embodying the features of the present invention, adapted especially for alternating current work. Fig. 2 is a vertical, central section through the volt meter. Fig. 3 is a similar view of the ammeter. Fig. 4 is a view similar to Fig. 1 of a modified form of the invention adapting the same for direct current work.

Referring to the drawings by numerals, 1 indicates the casing of a volt meter, and 2 the field magnets thereof. The armature 3 is mounted on pivots 4, suitably insulated, as at 5, 5, from the casing. Secured to the armature 3 is the usual index pointer 6, the upper end of which moves relative to the ordinary scale 7 for indicating voltage. An upper spring 3', of the usual type, presses pointer 6 toward the zero point of the scale, and said spring is electrically connected with the pointer, but insulated from case 1. Pointer 6 is electrically connected with one end of the winding of armature 3, and the other end of said winding is connected to the lower spring 3'' which connects with the external resistance 13. A conductor 8 connects with spring 3' and extends to one side of the battery 9 of secondary cells, and the other side of said battery is connected to conductor 10 extending to transformer 15 and branched at 10' to the resistance 13. A branch 14' extends from conductor 10 to one end of the winding of electro-magnet 11, the other end of said winding being connected to conductor 12, which extends to and is grounded upon case 1. Thus the volt meter circuit, consisting of conductor 8, pointer 6, spring 3', the winding of armature 3, spring 3'', resistance 13, conductor 10, and battery 9 is complete and independent of the relay circuit of magnet 11, which consists of conductor 8, spring 3', pointer 6, the pointer 23 hereinafter described, the casing of the volt meter 1, conductor 12, the winding of magnet 11, branch 14', conductor 10, and battery 9, the two circuits recited being independent of each other notwithstanding the fact that certain conductors are used in both circuits for the purposes of convenience.

A mercury vapor valve 16, as of the Cooper Hewitt type, has its discharge electrode 17 connected to conductor 8 intermediate the length thereof, and one component of the alternating current enters the valve from any suitable source of supply as from a transformer 15 through conductor 18 and electrode 19, and the other component of such current enters from the transformer through conductor 20 and electrode 21, the return being through electrode 17, conductor 8, battery 9 and conductor 10 to transformer 15. Intermediate the length of conductor 18 is arranged the armature 22 of magnet 11, for purposes hereinafter specified.

The pointer 23 is disposed within the casing 1 and arranged to swing concentrically with pointer 6, and is grounded on the casing 1 by a set screw 24 extending through an adjusting slot 25, adapted for adjustment of pointer 23 about the axis of its movement and for retaining pointer 23 in various adjusted positions. A contact portion 26 extends inwardly from pointer 23 and is adapted to contact with contact piece 27 on pointer 6, when the two pointers are brought into parallelism.

It is of course well known that the Cooper Hewitt mercury vapor lamp must be maintained excited by an alternating current in which the components overlap, that is to say, if the component which rises above the zero line drops to zero before the beginning of the rise of the other component at the opposite side of the zero line there will be an instant of a zero condition of the current which will result in the instantaneous extinguishing of the light, and to avoid this condition it has been common to cause an overlapping of the components of the current by causing the current to lag behind the E. M. F. After the lamp or valve has ceased its operation, it must again be started before current will again flow, and thus it becomes obvious that if either component of the current is omitted for the briefest possible period, the circuit will be instantly broken, and the present invention takes advantage of this fact by breaking one side of the valve circuit through actuation of armature 22, and as soon as that side of the circuit fails to operate, the other side can not operate, and thus the entire charging circuit is completely broken. Bearing this in mind, the operation may be stated substantially as follows: The battery 9 which may be made up of as many cells as desired is introduced into the valve circuit, as indicated in Fig. 1, the valve serving to rectify the current supplied by transformer 15, and the volt meter being in the battery circuit as indicated so that the meter will be influenced by the combined voltage of the cells comprising the battery. Normally, the exhausted voltage of one cell is two volts when not supplying current, and when the cell is fully charged its voltage is as high as from 2.50 v. to 2.55 v. during charging, this latter voltage dropping off somewhat immediately after the charging ceases. The operator, therefore, sets the pointer 23, by means of the adjusting set screw 24, at that voltage represented by the fully charged battery, and as soon as the meter is connected in circuit, the volt indicating pointer 6 will move to a position indicating the voltage of the battery, and as the charging current enters the battery the voltage of the battery will gradually rise, the pointer 6 moving across the face of the dial proportionately to the rise in voltage of the battery until the battery has become fully charged, whereupon the pointer 6 will have arrived in a position parallel to pointer 23 and the contact members 27 and 26 will have thus been brought into contact. As soon as this result has been effected the magnet circuit is energized from the battery and current will flow as follows: from positive pole of battery 9, through conductor 8, through spring 3', to pointer 6, to pointer 23, casing 1, and conductor 12, to winding of magnet 11, to branch 14', to conductor 10, to negative side of battery, which energizes the magnet 11 and drawing the armature 22 toward the magnet opens the valve circuit by interrupting conductor 18, thus destroying the continuity of one component of the alternating current supplied to valve 16. As the entire current is not broken, the resultant spark at the point of armature 22 is practically *nil*, and in fact I have frequently operated the structure and watched the point of breaking of the circuit by the movement of the armature 22 in the dark with no resultant spark whatever. Of course, the valve 16 responds instantly and the complete circuit is thus destroyed, no further current being supplied to the battery 9, and the flow of current from the battery through the circuit including magnet 11 being stopped with the slightest drop in voltage by the action of springs 3' and 3" moving the pointer 6 and breaking contact between contact elements 26 and 27. Thus the operation of the system is rendered automatic, it being only necessary to introduce the battery into the circuit as indicated and start the valve 16, the voltage of the cells acting upon the system to automatically take care of the rest of the operation, and this without sparking or burning out of parts. Obviously, the battery may be removed at any time after the charging operation and another set of cells substituted for being charged, the valve 16 being again started for starting the charging operation.

Special care is exercised to prevent armature 22 from coming into metallic contact with the core of magnet 11 or any other portion of the frame of the relay, an insulating block 22' being preferably fixed to the exposed end of the core of the magnet 11.

In order to break the circuit from overload I provide an ammeter 51 whose operation is exactly the same relative to the charging circuit as the operation described with respect to the volt meter, except that the volt meter is influenced by rise in voltage, while the ammeter is influenced by an overload. The ammeter 51 may be of the ordinary type having the field magnets with the interposed armature 52 carrying the indicating needle 53, which latter has its indicating end positioned to move across a graduated scale 54. The needle 53 is retained at its zero point normally by an upper spring 55 and a lower spring 56, the spring 55 being connected electrically with the needle 53, and the needle 53 being electrically connected with the coil of armature 52, the other end of the coil being connected with spring 56. An ammeter shunt 58 is interposed in the length of conductor 8 between the binding post 17 and the positive pole of battery 9, and a conductor 59 connects the conductor 8 at one side of shunt 58 with spring 55, the conductor 8 at the other side of shunt 58 being connected by a conductor 60 to spring 56. A conductor 61 is grounded on the casing of ammeter 51 and extends to and is grounded on the casing of volt meter 1. Within the casing of ammeter 51 the same is provided with an adjustable pointer 62 being constructed and arranged exactly the same as pointer 23 of volt meter 1, and having the contact portion 63 adapted to contact with pointer 53 when the pointers 62 and 53 arrive in parallelism. The pointer 62 is grounded on the casing of the ammeter and may be secured in any adjusted position by the adjusting thumb screw 64. Thus it will be observed that the ammeter is provided with a shunt circuit from the charging current and with a magnet circuit from the battery 9, each independent of the other, although for convenience a portion of some of the conductors in one circuit may be utilized in the other. The ammeter circuit or shunt circuit is as follows: from the bending post 17, through conductor 8, to conductor 59, to spring 55, to pointer 53, to the winding of armature 52, to spring 56, to conductor 60, to conductor 8 and to the battery 9. The magnet circuit for the ammeter is as follows: from the positive pole of battery 9, through conductor 8, to conductor 59, to spring 55, to pointer 53, to contact piece 63, to pointer 62, to the casing of ammeter 51, through conductor 61, to the casing of volt meter 1, through conductor 12, to winding of magnet 11, to branch conductor 14', to conductor 10, to battery 9. Thus it will be observed that so long as the load remains below the amperage for which the pointer 62 is set, the charging will continue, assuming the voltage to be proper, but in the event of overload either temporary or permanent, the consequent movement of the pointer 56 into parallelism with pointer 62 will close the magnet circuit and the armature 22 will be caused to break the charging circuit as above described. Obviously, the parts of the ammeter are insulated in the same manner as the corresponding parts of the volt meter to obviate short circuiting.

In Fig. 4, I have illustrated diagrammatically the improved system applied to a direct current supply, in which the volt meter 1 is constructed exactly as above described, and the same reference characters have been applied thereto. The ammeter 51 has been omitted, but of course may be utilized when desired, and when so utilized may be provided with the shunt circuit and magnet circuit as above set forth. The mercury vapor valve is not employed, and in lieu thereof I employ a contact make and break consisting of an electro-magnet 30, armature 31 and contact block 32, said armature having a contact point 33. Point 33 and block 32 are of a size and material not to be injured by sparking, though the spark occurring at this point is so inconsiderable as to be almost wholly negligible. Armature 31 may be spring actuated in a direction from the magnet or may be gravity operated as preferred. One end of the winding of magnet 30 is connected by conductor 34 with the source of current supply 35. The other end of said winding is connected by conductor 36 to block 32, said conductor 36 being branched, as at 37, to the armature 38 of an electro-magnet 39. A branch 40 of conductor 34 is adapted at times to be closed in circuit with armature 38 when magnet 39 is energized. A conductor 41 leads from battery 42 to spring 3' which is connected through pointer 6 to one end of the winding of armature 3, the other side of said battery being connected by a conductor 43 with the other side of generator 35 from conductor 34. A branch conductor 44 leads from conductor 43 to the external resistance 13 of the volt meter, which resistance is electrically connected with spring 3''. Conductor 44 is branched, as at 45, leading to one end of the winding of magnet 39, the other end of said winding being grounded on the casing of the meter, as by conductor 46. Conductor 41 is branched, as at 47, leading to the armature 31. When the battery 42 is introduced into the charging circuit and the current turned on, contact 33 being in contact with block 32, having been moved manually or otherwise into such contact, the charging circuit will be as follows: from generator 35, through conductor 34, through winding of magnet 30, through conductor 36, block 32, contact 33, armature 31, and conductors 47 and 41 to battery, and from battery to generator through conductor 43. The volt meter 1 of course responds to the battery voltage by reason of the battery circuit as follows: conductor 41, to spring 3' and pointer 6 to winding or armature 3, to spring 3'', to resistance 13, and conductor 44, to conductor 43 and battery. The pointer 23 having been set at the desired maximum voltage of the battery, the charging current continues to flow until the battery voltage rises sufficiently for bringing the pointers into parallelism, whereupon the contacting of contact members 26 and 27 will divert the battery current as follows: from battery through conductor 41, to spring 3', to pointer 6, to pointer 23, to the casing of volt meter 1, to conductor 46, to the winding of magnet 39, said winding being of low resistance relative to the resistance 13, and through branch conductor 45, to conductor 44 and conductor 43 back to battery. Current in this circuit actuates armature 38 and thus short circuits the generator current from magnet 30 as follows: from generator 35, through conductor 34, to branch conductor 40, through armature 38, to branch conductor 37, directly to conductor 36, to block 32, through contact 33, to armature 31, to conductors 47 and 41, to battery, to conductor 43, back to the generator. This short circuiting, eliminating the magnet 30, allows the armature 31 to be drawn or to fall away from the magnet and thus break contact between elements 32 and 33.

It will be observed that whichever system is employed, direct or alternating current, the meter contains or is provided with the resistance 13 which obviously is standardized for the meter, and it will be further observed that when the meter needle is moved by the battery voltage to a position for closing the electro-magnet circuit, the electro-magnet circuit is brought into parallelism with the resistance 13, and thereby temporarily destroys the standardization of said resistance 13. This causes the meter winding to receive an excess of current, and the contact 27 of pointer 6 will accordingly be caused to have a firm, intimate engagement with contact portion 26.

The subject matter of the structure disclosed in Fig. 4 is not herein specifically claimed as the same is made the subject of claim in my copending divisional application Serial No. 713,615, filed August 6, 1912.

Having thus described my invention, what I claim as new and desire to secure by Letters Patent is,—

1. In a system for charging secondary batteries, a source of alternating current supply, a mercury vapor rectifier therefor, a circuit for the alternating current to the rectifier, a battery, a charging circuit for the battery supplied with unidirectional current from the rectifier, a volt meter for the battery, a volt meter circuit connected to the battery for influencing the volt meter by battery current, and electrical means controlled and actuated by the volt meter for discontinuing one leg only of the alternating current circuit.

2. In a system of the class described, the combination with a source of alternating current supply, of a mercury vapor rectifier therefor, a charging circuit supplied from said rectifier, a contact make and break interposed in one leg of the rectifier circuit, an electro-magnet for opening the circuit at the make and break, a volt meter, an ammeter, a circuit for the electro-magnet adapted to be closed by the volt meter, and a circuit for the electro-magnet adapted to be closed by the ammeter.

3. In a system for charging secondary batteries, a source of alternating current supply, a mercury vapor rectifier therefor, a circuit for the alternating current to the rectifier, a battery, a charging circuit for the battery supplied with unidirectional current from the rectifier, an ammeter, a shunt circuit therefor from the charging circuit, a battery circuit connected through the ammeter adapted to be closed by the ammeter on overload, and means adapted to be actuated by the battery circuit when closed by the ammeter for discontinuing one leg only of the alternating current circuit.

4. In a system for charging secondary batteries, the combination with a source of alternating current supply, of a mercury vapor rectifier therefor, a circuit for the alternating current to the rectifier, a battery, a battery charging circuit supplied with unidirectional current from said rectifier, electrical means for discontinuing one leg only of the alternating current circuit, voltage influenced means for actuating said electrical means, and load influenced means for actuating the same.

5. In a system of the class described, the combination with a source of alternating current supply, of a rectifier, circuits from said source of supply for said rectifier, a battery charging circuit, a battery circuit, a resistance in said battery circuit, an electro-magnet, means actuated thereby for breaking one of the rectifier circuits, and means for short circuiting the battery circuit about the resistance and through the winding of the magnet.

6. In a system of the class described, the combination with a source of alternating current supply, of a rectifier, circuits from said source of supply for said rectifier, a battery charging circuit, a battery circuit, a resistance in said battery circuit, an electro-magnet, means actuated thereby for breaking one of the rectifier circuits, and battery voltage controlled means for short circuiting the battery circuit about the resistance and through the winding of the magnet.

7. In a system of the class described, the combination with a meter having a standardized resistance, of a charging circuit adapted to charge a battery, a battery circuit connected with the meter through said resistance, a switch controlling the charging circuit, an electromagnet for actuating the switch, a circuit for said magnet adapted to be supplied with current from the battery circuit and to be closed by the meter relative to the charging condition of the battery, the electro-magnet circuit being in parallel with the standardized resistance for destroying the standardization of said resistance temporarily while the circuit of said electro-magnet is closed.

8. In a system of the class described, the combination of a rectifying valve, a battery, a charging current circuit therefor, means for breaking one leg of said charging circuit, an electro-magnet for actuating said circuit breaking means, an ammeter for said charging circuit, a battery influenced volt meter, a circuit for said electro-magnet adapted to be closed by the volt meter, and a circuit for the electro-magnet adapted to be closed by the ammeter.

In testimony whereof I affix my signature in presence of two witnesses.

JAMES A. WOTTON.

Witnesses:
 WM. PARKER,
 EDGAR M. KITCHIN.